United States Patent
Thiam et al.

(10) Patent No.: US 8,111,196 B2
(45) Date of Patent: Feb. 7, 2012

(54) STACKED PATCH ANTENNAS

(75) Inventors: Cheikh Thiam, Grand Blanc, MI (US);
Andreas Fuchs, Orion, MI (US);
Ayman Duzdar, Holly, MI (US); Chun Kit Lai, Grand Blanc, MI (US)

(73) Assignee: Laird Technologies, Inc., Chesterfield, MI (US)

( * ) Notice: Subject to any disclaimer, the term of this patent is extended or adjusted under 35 U.S.C. 154(b) by 468 days.

(21) Appl. No.: 12/425,502

(22) Filed: Apr. 17, 2009

(65) Prior Publication Data

US 2009/0195477 A1 Aug. 6, 2009

Related U.S. Application Data

(63) Continuation-in-part of application No. 11/860,869, filed on Sep. 25, 2007, now Pat. No. 7,528,780, which is a continuation of application No. 11/606,333, filed on Nov. 29, 2006, now Pat. No. 7,277,056.

(60) Provisional application No. 60/845,101, filed on Sep. 15, 2006, provisional application No. 60/845,302, filed on Sep. 18, 2006.

(51) Int. Cl.
*H01Q 1/38* (2006.01)

(52) U.S. Cl. .................... 343/700 MS; 343/853; 455/78

(58) Field of Classification Search ........... 343/700 MS, 343/853, 893; 455/78, 136
See application file for complete search history.

(56) References Cited

U.S. PATENT DOCUMENTS

| | | | |
|---|---|---|---|
| 4,089,003 A | 5/1978 | Conroy | |
| 4,132,995 A | 1/1979 | Monser | |
| 4,356,492 A | 10/1982 | Kaloi | |
| 4,827,271 A | 5/1989 | Berneking et al. | |
| 4,873,529 A | 10/1989 | Gibson | |

(Continued)

FOREIGN PATENT DOCUMENTS

CN 101529651 A 9/2009

(Continued)

OTHER PUBLICATIONS

Taiwan Patent Office Decision (English translation provided) from Taiwan patent application No. 09612897 (now published as TW200818599) which is related to the instant application through a priority claim; dated Mar. 14, 2011; 3 pages.

(Continued)

*Primary Examiner* — Tan Ho
(74) *Attorney, Agent, or Firm* — Harness, Dickey & Pierce, P.L.C.

(57) ABSTRACT

According to various exemplary embodiments, an antenna assembly generally includes one or more antennas, such as a single multi-frequency antenna, first and second stacked patch antennas, etc. The antenna assembly may be operable for receiving signals having different frequencies (e.g., a frequency associated with a satellite digital audio radio service (SDARS), a frequency associated with a global positioning system (GPS), etc.). The antenna assembly may generally include at least one antenna (e.g., a single multi-frequency antenna, first and second stacked patch antennas, etc.) having at least one feed point and tuned to at least one of a first frequency and a second frequency that is different than the first frequency. A low noise amplifier may be in communication with the at least one feed point for amplifying signals having the first frequency and signals having the second received from a signal output. A single communication link may be used for communicating an output signal of the antenna assembly.

35 Claims, 3 Drawing Sheets

U.S. PATENT DOCUMENTS

| | | |
|---|---|---|
| 5,121,127 A | 6/1992 | Toriyama |
| 5,153,600 A | 10/1992 | Metzler |
| 5,396,658 A | 3/1995 | Hwu et al. |
| 6,008,770 A | 12/1999 | Sugawara |
| 6,087,990 A | 7/2000 | Thill et al. |
| 6,114,997 A | 9/2000 | Lee et al. |
| 6,181,281 B1 | 1/2001 | Desclos et al. |
| 6,307,525 B1 | 10/2001 | Bateman et al. |
| 6,466,768 B1 | 10/2002 | Agahi-Kesheh et al. |
| 6,538,609 B2 | 3/2003 | Nguyen et al. |
| 6,556,169 B1 | 4/2003 | Fukuura et al. |
| 6,639,558 B2 | 10/2003 | Kellerman et al. |
| 6,762,729 B2 | 7/2004 | Egashira |
| 6,806,838 B2 | 10/2004 | Petros et al. |
| 6,906,669 B2 | 6/2005 | Sabet et al. |
| 6,930,639 B2 | 8/2005 | Bauregger et al. |
| 7,019,705 B2 | 3/2006 | Pfletschinger et al. |
| 7,030,824 B1 | 4/2006 | Taft et al. |
| 7,084,815 B2 | 8/2006 | Phillips et al. |
| 7,116,952 B2 | 10/2006 | Arafa |
| 7,164,385 B2 | 1/2007 | Duzdar et al. |
| 7,245,261 B2 | 7/2007 | Zafar et al. |
| 7,277,056 B1 | 10/2007 | Thiam et al. |
| 7,295,167 B2 | 11/2007 | Aminzadeh et al. |
| 7,587,183 B2 * | 9/2009 | Duzdar et al. ............. 455/136 |
| 2004/0051661 A1 | 3/2004 | Wixforth et al. |
| 2004/0051675 A1 | 3/2004 | Inoue |
| 2004/0056803 A1 | 3/2004 | Soutiaguine et al. |
| 2004/0072575 A1 | 4/2004 | Young et al. |
| 2004/0075610 A1 | 4/2004 | Pan |
| 2004/0104858 A1 | 6/2004 | Pfletschinger et al. |
| 2004/0183735 A1 | 9/2004 | Jecko et al. |
| 2005/0215194 A1 | 9/2005 | Boling et al. |
| 2006/0097924 A1 | 5/2006 | Yegin et al. |
| 2006/0103576 A1 | 5/2006 | Mahmoud et al. |
| 2006/0205369 A1 | 9/2006 | Schaich et al. |
| 2006/0220970 A1 | 10/2006 | Aminzadeh et al. |
| 2006/0273969 A1 | 12/2006 | Aminzadeh et al. |
| 2007/0155350 A1 * | 7/2007 | Razavi et al. ............. 455/147 |
| 2007/0182626 A1 | 8/2007 | Samavati et al. |

FOREIGN PATENT DOCUMENTS

| | | |
|---|---|---|
| DE | 101 33 295 A1 | 1/2003 |
| EP | 0 323 664 A2 | 12/1988 |
| EP | 0 521 384 A1 | 1/1993 |
| EP | 1 249 892 A2 | 10/2002 |
| EP | 1357636 | 10/2003 |
| EP | 1619752 | 1/2006 |
| EP | 1744399 A | 1/2007 |
| EP | 1 901 439 A1 | 3/2008 |
| JP | 63004723 | 9/1988 |
| JP | 07-058657 A | 3/1995 |
| JP | 10-274535 A | 10/1998 |
| JP | 2000165135 | 6/2000 |
| JP | 2003-249818 A | 9/2003 |
| JP | 2006-121219 A | 5/2006 |
| TW | 200818599 | 4/2008 |
| WO | WO 01/03235 A1 | 1/2001 |
| WO | WO 02/49151 | 6/2002 |
| WO | WO 2008/033623 | 3/2008 |

OTHER PUBLICATIONS

International Preliminary Report from PCT application No. PCT/US2007/075075 (now published as WO 2008/033523) which is related to the instant application through a priority claim; dated Mar. 26, 2009, 7 pages.

EP office action from EP Application No. 07445030.5 (now published as EP 1901439) which is related to the instant application through a priority claim; dated Apr. 7, 2009; 5 pages.

Decision to Refuse from EP Application No. 07445030.5 (now published as EP 1901439) which is related to the instant application through a priority claim; dated Dec. 20, 2010; 4 pages.

U.S. Appl. No. 60/724,121 entitled Combined Antenna Module with Single Output, Samavati, filed Oct. 6, 2005.

E.B. Perri, "Dual band cellular antenna in a multifunction platform for vehicular applications", 2006 IEEE Antennas and Propagation Society International Symposium, Albuquerque, NM, USA, Jul. 9-14, 2006 (abstract).

E.B. Perri, "Dual band cellular antenna in a multifunction platform for vehicular applications", 2006 IEEE, University of Sao Paulo—Dept. of Telecommunications and Control Engineering Av. Prof. Luciano Gualberto, trav. 3, 158 ZC 05508-900 Sao Paulo, Brazil (2006) pp. 2361-2364.

S. Maci and G. Biffi Gentili, "Dual-Frequency Patch Antennas," IEEE Antennas and Propagation Magazine, Bd. 39, Nr 6, Dec. 1997, pp. 13-20.

Handbook of Microstrip Antennas, 1989, pp. 318-320.

"Build This No-Tune Dual-Band Feed for Mode L/S", The Armstrong Journal, Jan./Feb. 2002, 7 pages.

European Search Report dated Mar. 9, 2006 in European Application No. EP 05 01 5079.6, 6 pages.

German Patent Office Action dated Jun. 3, 2005 in German Application No. 10 2004 035 064.7-55, filed Jul. 20, 2004, 4 pages.

Govind V. et al: "Design of multiband baluns on liquid crystalline polymer (LCP) based substrates" Electronic Components and Technology, 2004. ECTC -04. Proceedings Las Vegas, NV, USA Jun. 1-4, 2004, Piscataway, NJ, USA, IEEE, vol. 2, Jun. 1, 2004, pp. 1812-1818, XPO10715244 ISBN: 0-7803-8365-6 *abstract* *figures 1-3* *p. 1812, col. 1, paragraph 2—p. 1816, col. 1, paragraph 2*, 7 pages.

Hossein Hashemi et al: "Concurrent Multiband, Low-Noise Amplifiers-Theory, Design and Applications" IEEE Transactions on Microwave Theory and Techniques, IEEE Service Center, Piscataway, NJ, US, vol. 50, No. 1, Jan. 2002, XP011038576 ISSN: 0018-9480 *abstract* *figures 2, 3* *p. 288, col. 1, paragraph 3—col. 2, paragraph 3* *p. 3*, col. 1, paragraph 2—p. 4, col. 1, paragraph 3*, 14 pages.

Search Report from Taiwan patent application No. 96128970, which is related to the instant application through a priority claim, dated Aug. 17, 2010, 2 pages.

* cited by examiner

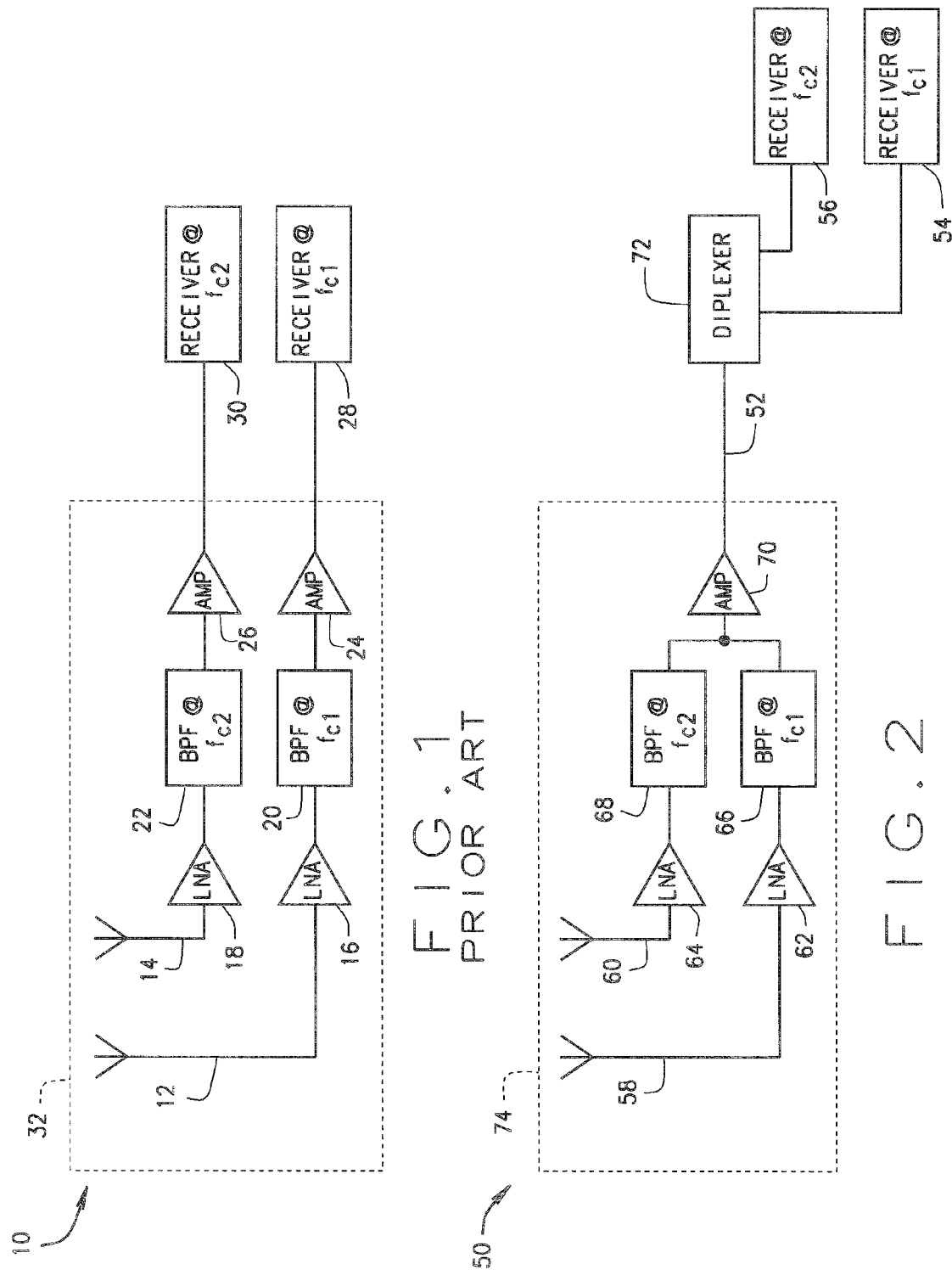

STACKED PATCH ANTENNAS

CROSS-REFERENCE TO RELATED APPLICATIONS

This application is a continuation-in-part application of allowed U.S. patent application Ser. No. 11/860,869 filed Sep. 25, 2007, which, in turn, is continuation of U.S. patent application Ser. No. 11/606,333 filed Nov. 29, 2006 (now U.S. Pat. No. 7,277,056 issued Oct. 2, 2007), which, in turn claimed the benefit of U.S. Provisional Application No. 60/845,101 filed Sep. 15, 2006 and U.S. Provisional Application No. 60/845,302 filed Sep. 18, 2006. The entire disclosures of the above applications are incorporated herein by reference in their entirety.

FIELD

The present disclosure relates to stacked patch antennas.

BACKGROUND

The statements in this section merely provide background information related to the present disclosure and may not constitute prior art.

Referring now to FIG. 1, a radio receiver system 10 is shown. As shown, system 10 includes a first patch antenna 12 tuned to a first center frequency fc1. System 10 also includes a second patch antenna 14 tuned to a second center frequency fc2. In some embodiments, first center frequency fc1 may be a frequency used by the Satellite Digital Audio Radio Service (SDARS) (e.g., 2.320 GHz to 2.345 GHz in the United States, etc.), and second center frequency fc2 may be a frequency used by the Global Positioning System (GPS) (e.g., at least 1.575 GHz, etc.).

As shown in FIG. 1, a first low noise amplifier (LNA) 16 amplifies the signal from first patch antenna 12. A second LNA 18 amplifies the signal from second patch antenna 14. Signals from first LNA 16 and second LNA 18 communicate with inputs of respective band pass filters 20, 22 that have center frequencies at fc1 and fc2, respectively. A first amplifier 24 amplifies the signal from an output of first band pass filter 20. A second amplifier 26 amplifies the signal from an output of second band pass filter 22.

A first radio receiver 28 receives the signal from first amplifier 24. In some embodiments, first radio receiver 28 may be an SDARS receiver that is compatible with SIRIUS satellite radio and/or XM satellite radio broadcast signals. A second radio receiver 30 receives the signal from second amplifier 26. In some embodiments, second radio receiver 30 may be a GPS receiver that includes a display and/or user interface.

First patch antenna 12, second patch antenna 14, first LNA 16, second LNA 18, first band pass filter 20, second band pass filter 22, first amplifier 24, and second amplifier 26 may be assembled into a compact antenna assembly 32. Antenna assembly 32 may be suitable for mounting on a structure, such as a motor vehicle roof.

Coaxial cables may be used for making the connections between first amplifier 24 and first radio receiver 28 and between second amplifier 26 and second radio receiver 30. First LNA 16, second LNA 18, and coaxial cables tend to be fairly expensive when compared to the costs associated with the other elements of the antenna assembly 32.

SUMMARY

According to various exemplary embodiments, an antenna assembly generally includes one or more antennas, such as first and second stacked patch antennas, a single multi-frequency antenna, etc. In an exemplary embodiment, an antenna assembly is operable for receiving signals having different frequencies (e.g., a frequency associated with a satellite digital audio radio service (SDARS), a frequency associated with a global positioning system (GPS), etc.). This embodiment of the antenna assembly generally includes one or more antennas (e.g., a single multi-frequency antenna, first and second stacked patch antennas, etc.) having at least one feed point and tuned to at least one of a first frequency and a second frequency that is different than the first frequency. A low noise amplifier may be in communication with at least one feed point of an antenna for receiving and amplifying signals from the antenna. In various embodiments, first and second band pass filters are operable for receiving signals from an output of the low noise amplifier. An amplifier may be provided that is operable for receiving a signal from an output of the first band pass filter and a signal from the output of the second band pass. The amplifier may generate an output signal.

Another exemplary embodiment includes an antenna assembly that is also operable for receiving signals having different frequencies (e.g., a frequency associated with a satellite digital audio radio service (SDARS), a frequency associated with a global positioning system (GPS), etc.). The antenna assembly generally includes at least one antenna (e.g., a single multi-frequency antenna, first and second stacked patch antennas, etc.) having at least one feed point and tuned to at least one of a first frequency and a second frequency that is different than the first frequency. A low noise amplifier may be in communication with the at least one feed point for amplifying signals having the first frequency and signals having the second received from a signal output. A single communication link may be used for communicating an output signal of the antenna assembly.

Other exemplary embodiments include methods relating to operation of antenna assemblies capable of receiving signals having different frequencies (e.g., a frequency associated with a satellite digital audio radio service (SDARS), a frequency associated with a global positioning system (GPS), etc.). The antenna assembly may include at least one antenna (e.g., a single multi-frequency antenna, first and second stacked patch antennas, etc.) having at least one feed point and tuned to at least one of a first frequency and a second frequency that is different from the first frequency. The method may generally includes inputting a signal output for a signal received by the at least one antenna to a low noise amplifier for amplification. The method may also include outputting an output signal of the antenna assembly on a single communication link (e.g., a coaxial cable, etc.).

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a functional block diagram of a dual-frequency radio receiver system in accordance with the prior art;

FIG. 2 is a functional block diagram of a radio receiver system according to an exemplary embodiment;

DETAILED DESCRIPTION

Figure 3:
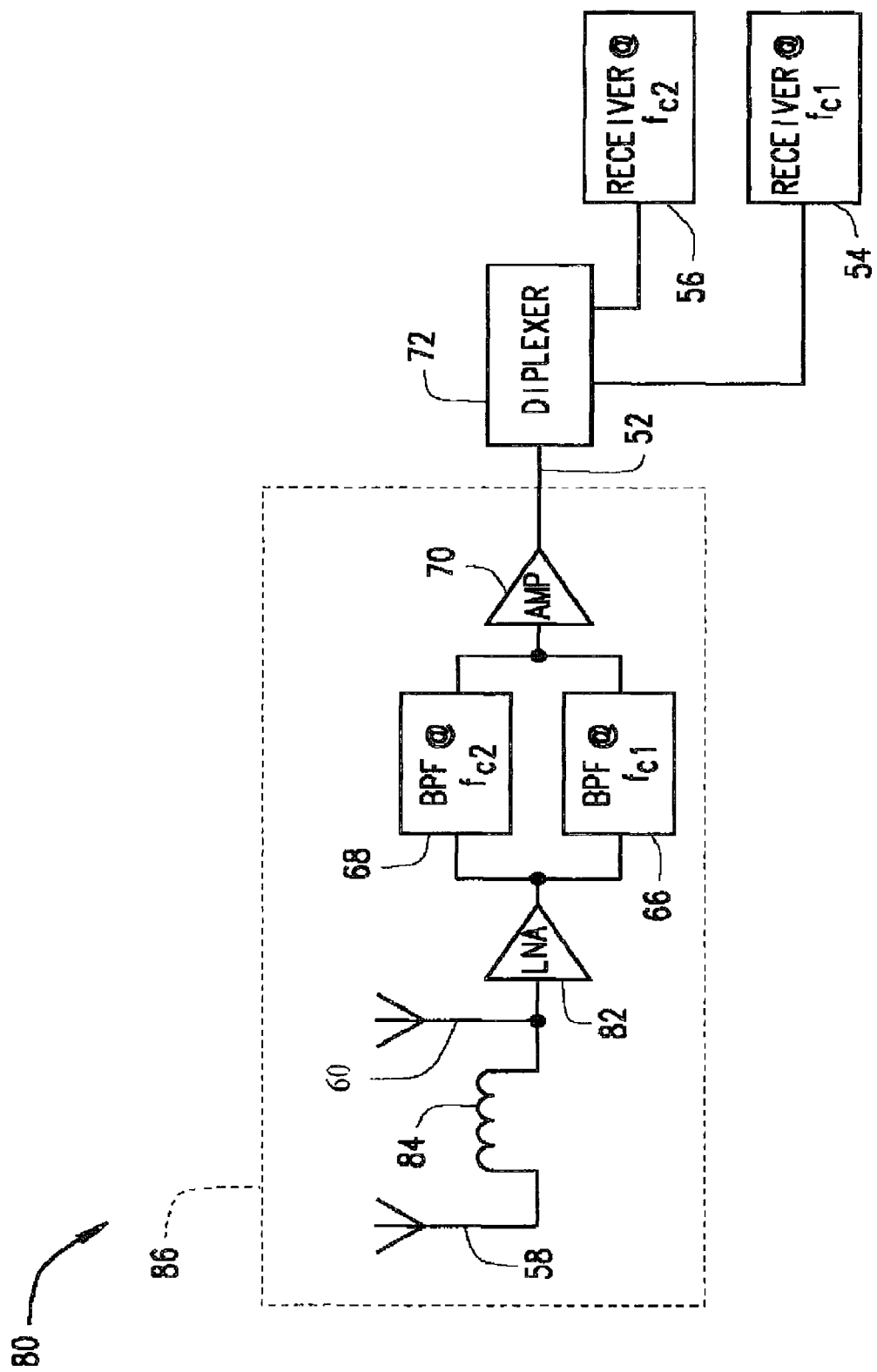
FIG. 3 is a functional block diagram of another exemplary embodiment of a radio receiver system.

The following description is merely exemplary in nature and is not intended to limit the present disclosure, application, or uses. It should be understood that throughout the drawings, corresponding reference numerals indicate like or corresponding parts and features.

With reference now to the figures, FIG. 2 illustrates an exemplary radio receiver system 50 embodying one or more aspects of the present disclosure. As shown, system 50 employs an architecture that allows a single coaxial cable 52 (or other suitable communication link or line) to communicate an output signal from an amplifier 70 to a splitter or diplexer 72, which then divides the output signal into a first signal (for a first radio receiver 54) and a second signal (for a second radio receiver 56). The first and second signals have center frequencies at fc1 and fc2, respectively. In some embodiments, the first radio receiver 54 may be a SDARS receiver that is compatible with SIRIUS satellite radio and/or XM satellite radio broadcast signals. In some embodiments, the second radio receiver 56 may be a GPS receiver that includes a display and/or user interface. Alternative embodiments may include other receivers.

In this particular embodiment, the system 50 includes a first patch antenna 58 tuned to and operable at a first center frequency fc1. System 50 also includes a second patch antenna 60 tuned to and operable at a second center frequency fc2. Alternative embodiments may include other suitable antennas besides patch antennas. For example, other embodiments may include a single multi-frequency antenna that is tuned to and operable (tuned for operation) at the first and second center frequencies fc1 and fc2.

In some embodiments, the first center frequency fc1 may be a frequency used by the Global Positioning System (GPS), and the second center frequency fc2 may be a frequency used by the Satellite Digital Audio Radio Service (SDARS). Alternatively, either or both patch antennas 58 and/or 60 may be configured for receiving other signals besides GPS and SDARS, respectively, and/or be tuned for higher or lower frequency bands, for example, by adjusting the dimensions of the antenna structures. Additionally, or alternatively, the range of frequency bands may be selected for the first and/or the second patch antennas 58, 60 by changing the dielectric material(s) of the substrate(s) accordingly to achieve certain frequency band(s).

The second patch antenna 60 may be stacked on top of the first patch antenna 58 in the exemplary manner disclosed in U.S. Pat. No. 7,489,280 and/or in U.S. Pat. No. 7,295,167, the disclosures of which are incorporated herein by reference in their entirety. Alternatively, the first and second patch antennas may be placed side by side, or the antenna assembly may comprise one or more other suitable antennas besides patch antennas.

With continued reference to FIG. 2, a first low noise amplifier (LNA) 62 amplifies the signal from first patch antenna 58. A second LNA 64 amplifies the signal from second patch antenna 60. Signals from first and second LNAs 62 and 64 pass through respective band pass filters 66, 68 that have center frequencies at fc1 and fc2, respectively. Output signals from first and second band pass filters 66, 68 are combined and applied to an input of an amplifier 70.

A splitter or diplexer 72 receives the signal from amplifier 70 via the single coaxial cable 52 (or other suitable communication link or line). The splitter or diplexer 72 divides the signal into a first signal that is centered at fc1 and a second signal that is centered at fc2. The first radio receiver 54 receives the first signal. The second radio receiver 56 receives the second signal.

The first patch antenna 58, second patch antenna 60, first LNA 62, second LNA 64, first band pass filter 66, second band pass filter 68, and amplifier 70 may be assembled into a compact antenna assembly 74. This compact antenna assembly 74 may be adapted for mounting on a structure, such as a motor vehicle roof.

Referring now to FIG. 3, a second embodiment of a radio receiver system 80 is shown. The system 80 employs an architecture that allows a single LNA 82 to amplify the signal from the first patch antenna 58 and to amplify the signal from the second patch antenna 60. The system 80 also employs a single coaxial cable 52 (or other suitable communication link or line) to communicate the signal from the amplifier 70 to the splitter or diplexer 72. The first patch antenna 58 can be stacked on top of the second patch antenna 60 in the exemplary manner disclosed in U.S. Pat. No. 7,489,280 and/or in U.S. Pat. No. 7,295,167, the disclosures of which are both incorporated herein by reference in their entirety.

Figure 6:
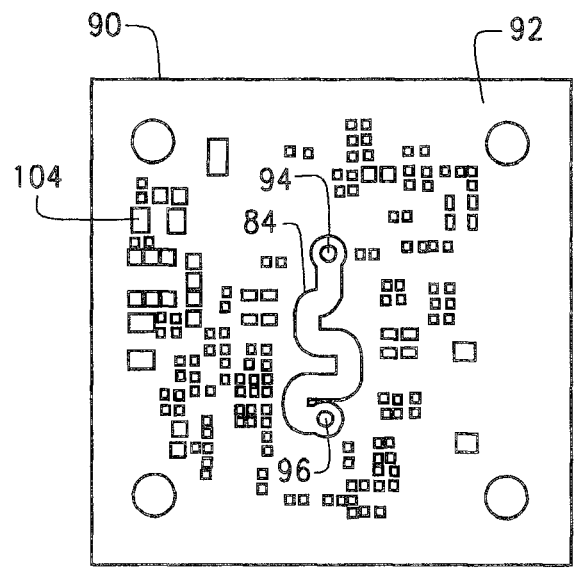
FIG. 6 is a plan view of a printed circuit board that is positioned on the stacked patch antennas shown in FIG. 4.

A transmission line 84 connects between a feed point of first patch antenna 58 and a feed point of second patch antenna 60. The transmission line 84 may be formed as a trace on a printed circuit board (PCB) 90 as shown in FIG. 6. Alternative communication links (e.g., other electrical circuits or feeds, etc.) and/or means for providing a signal output for signals received by the first and second patch antennas may also be employed in other embodiments. The transmission line 84 is discussed in more detail below.

LNA 82 amplifies the signal from the second patch antenna 60. LNA 82 also amplifies the signal from the first patch antenna 58. The transmission line 84 communicates the signal from the first patch antenna 58 to the input of LNA 82. An output of LNA 82 communicates with the input of first band pass filter 66 and the input of the second band pass filter 68. The outputs of first and second band pass filters 66 and 68 are coupled and communicate with the input of amplifier 70.

The output of amplifier 70 communicates with the input of diplexer 72. Diplexer 72 receives a signal from the output of amplifier 70 via the single coaxial cable 52 (or other suitable communication link or line). The diplexer 72 divides that signal into a first signal centered at fc1 and a second signal centered at fc2. The first radio receiver 54 receives the first signal. The second radio receiver 56 receives the second signal.

First patch antenna 58, second patch antenna 60, LNA 82, band pass filters 66, 68, and amplifier 70 may be assembled into a compact antenna assembly 86. This compact antenna assembly 86 may be suitable for mounting on a structure, such as a motor vehicle roof.

The transmission line 84 will now be described in more detail with reference to the illustrated embodiments. In order for the stacked combination of first patch antenna 58 and second patch antenna 60 to function properly, any interference between the patch antennas should preferably be minimized or at least reduced. Reducing the interference between first patch antenna 58 and second patch antenna 60 may be equivalent to increasing the isolation between them.

In the following example, fc1 is an SDARS frequency between 2320 Megahertz to 2345 Megahertz, and fc2 is a GPS frequency of 1575 Megahertz. One exemplary way of increasing the isolation provided by transmission line 84 is to make sure that the impedance from first patch antenna 58 is high at the GPS frequency, and also that the impedance of first patch antenna 58 (as seen by second patch antenna 60) remains high at the SDARS frequency. This can be achieved using transmission line 84 with a characteristic impedance of fifty ohms between the first patch antenna 58 and second patch antenna 60. In some embodiments, the transmission line 84 is one-quarter wavelength at the GPS frequency.

In a lossless and homogenous dielectric medium characterized with its permittivity $\in_r$ and permeability $\mu$, the effect of transmission line 84 can be analyzed with the following equations:

$$Z_{in} = \frac{z_{load} + jtg\beta l}{1 + jz_{load}tg\beta l} \quad \text{(Equation 1)}$$

$$\beta = 2\pi/\lambda \text{ and} \quad \text{(Equation 2)}$$

$$\lambda = \frac{C}{f\sqrt{\varepsilon_r}} \quad \text{(Equation 3)}$$

wherein:
C=speed of light,
f=frequency,
$\in_r$=relative permittivity of the medium,
$Z_{in}$=impedance transformed at the input (transformed impedance),
$z_{load}$=impedance at the opposite side of the input (load impedance), and
$\lambda$=wavelength.

If a length l of transmission line 84 is $\lambda/4$ at the GPS frequency, then the low impedance of first patch antenna 58 is transformed into a high impedance as shown below by Equation 4.

$$Z_{in} \approx jtg\beta l \approx jtg(\pi/2) = \infty \quad \text{(Equation 4)}$$

At the SDARS frequency, the length l of transmission line 84 is $1.47*\lambda$ (approximately $1.5*\lambda$). Since second patch antenna 60 has high impedance, first patch antenna 58 sees from second patch antenna 60 the following impedance:

$$Z_{in} \approx jtg\beta l \approx jtg(\pi/2) = \infty \quad \text{(Equation 5)}$$

Transmission line 84 therefore provides satisfactory isolation between first patch antenna 58 and second patch antenna 60.

In some embodiments, the transmission line 84 comprises a one-quarter wavelength transformer (at the GPS frequency) operable as a radio frequency choke for isolating the outputs or signals from the first patch antenna 58 from the different outputs or signals from the second patch antenna 60. For example, some embodiments may have the transmission line 84 isolating SDARS signals received by the first patch antenna 58 from GPS signals received by the second patch antenna 60. As noted herein, however, either or both patch antennas 58 and/or 60 may be configured for receiving other signals besides SDARS and GPS, respectively and/or be tuned for higher or lower frequency bands, for example, by adjusting their respective dielectric constants and/or dimensions of their respective antenna structures. In some embodiments, each patch antenna 58 and 60 includes one-half wavelength ($\lambda/2$) antenna structure provided on an upper surface of the lower substrate for reception of satellite transmitted frequencies in the GHz range.

Figure 4:
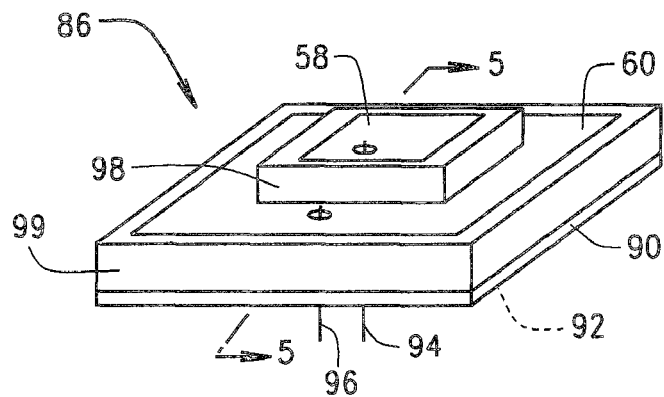
FIG. 4 is a perspective view of stacked patch antennas that are included in the radio receiver system shown in FIG. 3.

Referring now to FIG. 4, a perspective view is shown of antenna assembly 86. First patch antenna 58 is shown positioned or stacked on second patch antenna 60. Second patch antenna 60 is positioned on the PCB 90. A component side 92 of PCB 90 includes circuit traces and pads to accommodate components of LNA 82, band pass filters 66 and 68, amplifier 70, and transmission line 84. A first lead 94 provides a connection to the feed point of first patch antenna 58. A second lead 96 provides a connection to the feed point of second patch antenna 60. First patch antenna 58 includes a first dielectric layer 98. In some embodiments, the dielectric constant of first dielectric layer 98 is about twenty. Second patch antenna 60 includes a second dielectric layer 99. In some embodiments, the dielectric constant of second dielectric layer 99 may be between about two and four, inclusive. In these embodiments, the dielectric constant of first dielectric layer 98 is generally greater than the dielectric constant of second dielectric layer 99. This relationship generally assures that second patch antenna 60 will have sufficient surface area to accommodate first patch antenna 58.

Figure 5:
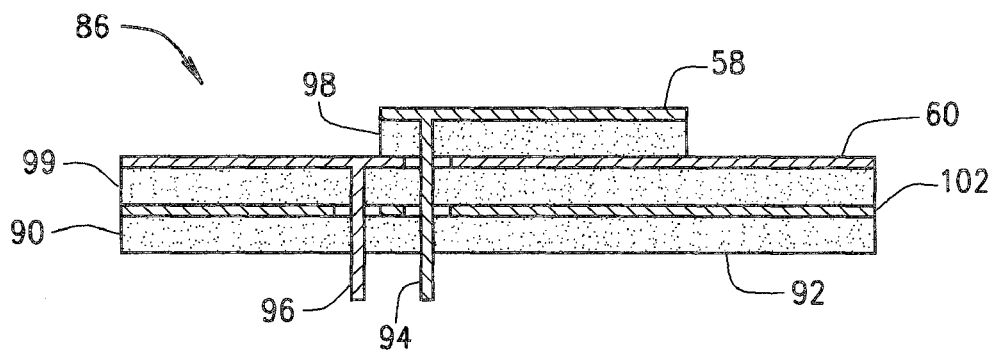
FIG. 5 is a cross section of the stacked patch antennas shown in FIG. 4.

Referring now to FIG. 5, antenna assembly 86 is shown in cross section along section line 5-5 of FIG. 4. Second patch antenna 60 provides a metallization layer for first patch antenna 58. A second metallization layer 102 is provided for second patch antenna 60. The second metallization layer 102 is layered between PCB 90 and second dielectric layer 99.

Referring now to FIG. 6, component side 92 of PCB 90 is shown. In this illustrated embodiment, transmission line 84 may be formed as a meandering circuit trace on PCB 90. Component side 92 also includes a number of pads and traces 104 that accommodate and connect the components of LNA 82, first band pass filter 66, second band pass filter 68, and amplifier 70.

It should be noted that embodiments and aspects of the present disclosure may be used in a wide range of antenna applications, such as patch antennas, telematics antennas, antennas configured for receiving satellite signals (e.g., Satellite Digital Audio Radio Services (SDARS), Global Positioning System (GPS), cellular signals, etc.), terrestrial signals, antennas configured for receiving RF energy or radio transmissions (e.g., AM/FM radio signals, etc.), combinations thereof, among other applications in which wireless signals are communicated between antennas. Accordingly, the scope of the present disclosure should not be limited to only one specific form/type of antenna assembly.

In addition, various antenna assemblies and components disclosed herein may be mounted to a wide range of supporting structures, including stationary platforms and mobile platforms. For example, an antenna assembly disclosed herein could be mounted to supporting structure of a bus, train, aircraft, among other mobile platforms. Accordingly, the specific references to motor vehicles herein should not be construed as limiting the scope of the present disclosure to any specific type of supporting structure or environment.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. An antenna assembly operable for receiving signals having different frequencies, the antenna assembly comprising:
    one or more antennas including at least one feed point and tuned to at least one of a first frequency and a second frequency that is different than the first frequency;
    a low noise amplifier in communication with the at least one feed point of said one or more antennas for receiving and amplifying signals from the one or more antennas;
    first and second band pass filters operable for receiving signals from an output of the low noise amplifier; and
    an amplifier operable for receiving a signal from an output of the first band pass filter and for receiving a signal from the output of the second band pass filter, the amplifier operable for generating an output signal.

2. The antenna assembly of claim 1, further comprising a single communication link for communicating the output signal from the amplifier.

3. The antenna assembly of claim 2, wherein the single communication link comprises a single coaxial cable.

4. The antenna assembly of claim 1, wherein the one or more antennas include only one multi-frequency antenna with only one feed point and that is tuned for operation at both the first frequency and the second frequency.

5. The antenna assembly of claim 1, wherein the one or more antennas comprise:
    a first antenna including a first feed point and tuned to the first frequency;
    a second antenna including a second feed point, and tuned to the second frequency;
    wherein the low noise amplifier is in communication with the first and second feed points of the respective first and second antennas for amplifying signals received by the first and second antennas.

6. The antenna assembly of claim 5, wherein the first and second antennas are stacked patch antennas.

7. The antenna assembly of claim 5, wherein the antenna assembly includes only one said low noise amplifier that is shared by the first and second antennas.

8. The antenna assembly of claim 5, wherein the first frequency is associated with a satellite digital audio radio service, and wherein the second frequency is associated with a global positioning system.

9. The antenna assembly of claim 1, further comprising an electrical circuit or feed in communication with the at least one feed point, for providing the signal output to the low noise amplifier for signals received by the one or more antennas.

10. The antenna assembly of claim 1, further comprising a transmission line in communication with the at least one feed point, the transmission line operable for providing the signal output for signals received by the one or more antennas, and wherein the low noise amplifier is operable for receiving and amplifying signals from the signal output of the transmission line.

11. The antenna assembly of claim 10, wherein:
    the at least one antenna comprises:
        a first patch antenna including a first feed point and tuned to the first frequency;
        a second patch antenna including a second feed point, and tuned to the second frequency;
    the transmission line has a first end in communication with the first feed point and a second end in communication with the second feed point, the second end of the transmission line providing the signal output for signals received by the first and second patch antennas, the transmission line configured to provide an impedance between said first and said second patch antennas such that the impedance of the first patch antenna is high at the second frequency to provide isolation between the first and second patch antennas.

12. The antenna assembly of claim 10, wherein the transmission line has a length of about one-quarter wavelength at a frequency associated with a global positioning system, and wherein the transmission line has a length of about one and one-half wavelength at a frequency associated with a satellite digital audio radio service.

13. The antenna assembly of claim 10, wherein the transmission line comprises a circuit board trace having a meandering pattern on a printed circuit board.

14. The antenna assembly of claim 1, wherein the antenna assembly includes only one said amplifier, only one said low noise amplifier, and only one coaxial cable for communicating the output signal from the amplifier.

15. The antenna assembly of claim 1, further comprising a communication link configured to communicate the output signal from the amplifier to a diplexer, which is operable for dividing the output signal from the amplifier into a first signal centered at the first frequency for a first radio receiver, and a second signal centered at the second frequency for a second radio receiver.

16. The antenna assembly of claim 1, wherein the one or more antennas comprise first and second stacked patch antennas respectively tuned to the first and second frequencies, and wherein the low noise amplifier comprises first and second low noise amplifiers operable for receiving and amplifying signals from the respective first and second stacked patch antennas.

17. An antenna assembly operable for receiving signals having different frequencies, the antenna assembly comprising:
    at least one antenna including at least one feed point and tuned to at least one of a first frequency and a second frequency that is different than the first frequency;
    a low noise amplifier in communication with the at least one feed point for amplifying signals having the first frequency and signals having the second received from a signal output;
    a single communication link for communicating an output signal of the antenna assembly; and
    a transmission line in communication with the at least one feed point, the transmission line operable for providing the signal output for signals received by the at least one antenna;
    wherein the low noise amplifier is operable for receiving and amplifying signals from the signal output of the transmission line; and wherein the transmission line comprises a circuit board trace having a meandering pattern on a printed circuit board.

18. The antenna assembly of claim 17, wherein the single communication link comprises a single coaxial cable.

19. The antenna assembly of claim 17, wherein the at least one antenna includes only one multi-frequency antenna with only one feed point and that is tuned for operation at both the first frequency and the second frequency.

20. The antenna assembly of claim 17, wherein the first frequency is associated with a satellite digital audio radio service, and wherein the second frequency is associated with a global positioning system.

21. The antenna assembly of claim 17, further comprising first and second band pass filters operable for receiving a signal from an output of the low noise amplifier.

22. An antenna assembly operable for receiving signals having different frequencies, the antenna assembly comprising:
- at least one antenna including at least one feed point and tuned to at least one of a first frequency and a second frequency that is different than the first frequency;
- a low noise amplifier in communication with the at least one feed point for amplifying signals having the first frequency and signals having the second received from a signal output; and
- a single communication link for communicating an output signal of the antenna assembly;
- wherein the at least one antenna comprises:
  - a first antenna including a first feed point and tuned to the first frequency;
  - a second antenna including a second feed point, and tuned to the second frequency;
  - wherein the low noise amplifier is in communication with the first and second feed points of the respective first and second antennas for amplifying signals received by the first and second antennas.

23. The antenna assembly of claim 22, further comprising means for providing the signal output for signals received by the at least one antenna, and wherein the low noise amplifier is operable for receiving and amplifying signals from the signal output.

24. The antenna assembly of claim 22, further comprising an electrical circuit or feed in communication with the at least one feed point, for providing to the low noise amplifier the signal output for signals received by the at least one antenna.

25. The antenna assembly of claim 22, further comprising a transmission line in communication with the at least one feed point, the transmission line operable for providing the signal output for signals received by the at least one antenna, and wherein the low noise amplifier is operable for receiving and amplifying signals from the signal output of the transmission line.

26. The antenna assembly of claim 25, wherein the transmission line comprises a circuit board trace having a meandering pattern on a printed circuit board.

27. An antenna assembly operable for receiving signals having different frequencies, the antenna assembly comprising:
- at least one antenna including at least one feed point and tuned to at least one of a first frequency and a second frequency that is different than the first frequency;
- a low noise amplifier in communication with the at least one feed point for amplifying signals having the first frequency and signals having the second received from a signal output; and
- a single communication link for communicating an output signal of the antenna assembly;
- wherein the at least one antenna comprises:
  - a first patch antenna including a first feed point and tuned to the first frequency;
  - a second patch antenna including a second feed point, and tuned to the second frequency;
  - wherein the low noise amplifier is in communication with the first and second feed points of the respective first and second patch antennas for amplifying signals received by the first and second patch antennas.

28. The antenna assembly of claim 27, wherein the first patch antenna is stacked with the second patch antenna.

29. The antenna assembly of claim 27, wherein the antenna assembly includes only one said low noise amplifier that is shared by the first and second patch antennas.

30. An antenna assembly operable for receiving signals having different frequencies, the antenna assembly comprising:
- at least one antenna including at least one feed point and tuned to at least one of a first frequency and a second frequency that is different than the first frequency;
- a low noise amplifier in communication with the at least one feed point for amplifying signals having the first frequency and signals having the second received from a signal output;
- a single communication link for communicating an output signal of the antenna assembly;
- a transmission line in communication with the at least one feed point, the transmission line operable for providing the signal output for signals received by the at least one antenna;
- wherein the low noise amplifier is operable for receiving and amplifying signals from the signal output of the transmission line; and
- wherein:
  - the at least one antenna comprises:
    - a first patch antenna including a first feed point and tuned to the first frequency;
    - a second patch antenna including a second feed point, and tuned to the second frequency;
  - the transmission line has a first end in communication with the first feed point and a second end in communication with the second feed point, the second end of the transmission line providing the signal output for signals received by the first and second patch antennas, the transmission line configured to provide an impedance between said first and said second patch antennas such that the impedance of the first patch antenna is high at the second frequency to provide isolation between the first and second patch antennas.

31. An antenna assembly operable for receiving signals having different frequencies, the antenna assembly comprising:
- at least one antenna including at least one feed point and tuned to at least one of a first frequency and a second frequency that is different than the first frequency;
- a low noise amplifier in communication with the at least one feed point for amplifying signals having the first frequency and signals having the second received from a signal output;
- a single communication link for communicating an output signal of the antenna assembly;
- a transmission line in communication with the at least one feed point, the transmission line operable for providing the signal output for signals received by the at least one antenna;

wherein the low noise amplifier is operable for receiving and amplifying signals from the signal output of the transmission line; and wherein the transmission line has a length of about one-quarter wavelength at a frequency associated with a global positioning system, and wherein the transmission line has a length of about one and one-half wavelength at a frequency associated with a satellite digital audio radio service.

32. An antenna assembly operable for receiving signals having different frequencies, the antenna assembly comprising:

at least one antenna including at least one feed point and tuned to at least one of a first frequency and a second frequency that is different than the first frequency;

a low noise amplifier in communication with the at least one feed point for amplifying signals having the first frequency and signals having the second received from a signal output;

a single communication link for communicating an output signal of the antenna assembly;

first and second band pass filters operable for receiving a signal from an output of the low noise amplifier; and an amplifier operable for generating the output signal of the antenna assembly from signals received from outputs of the first and second band pass filters.

33. The antenna assembly of claim 32, wherein the single communication link comprises a single coaxial cable, and wherein the antenna assembly includes only one said amplifier, only one said low noise amplifier, and only one said coaxial cable.

34. The antenna assembly of claim 32, wherein the single communication link is configured to communicate the output signal from the amplifier to a diplexer, which is operable for dividing the output signal from the amplifier into a first signal centered at the first frequency for a first radio receiver, and a second signal centered at the second frequency for a second radio receiver.

35. An antenna assembly operable for receiving signals having different frequencies, the antenna assembly comprising:

at least one antenna including at least one feed point and tuned to at least one of a first frequency and a second frequency that is different than the first frequency;

a low noise amplifier in communication with the at least one feed point for amplifying signals having the first frequency and signals having the second received from a signal output; and a single communication link for communicating an output signal of the antenna assembly;

wherein the at least one antenna comprises:

a first patch antenna including a first feed point and a first dielectric layer, the first patch antenna being tuned to the first frequency;

a second patch antenna including a second feed point and a second dielectric layer having a dielectric constant less than that of the first dielectric layer, the second patch antenna being tuned to the second frequency and disposed on a circuit board, the first patch antenna being stacked on the second patch antenna;

a first lead providing a connection to the first feed point of the first patch antenna;

a second lead providing a connection to the second feed point of second patch antenna;

a first metallization layer between the first dielectric layer and the second patch antenna; and a second metallization layer between the second dielectric layer and the circuit board.

* * * * *